United States Patent
Okochi et al.

(10) Patent No.: US 11,486,378 B2
(45) Date of Patent: Nov. 1, 2022

(54) ELECTRIC COMPRESSOR

(71) Applicant: KABUSHIKI KAISHA TOYOTA JIDOSHOKKI, Aichi-ken (JP)

(72) Inventors: Takeshi Okochi, Aichi-ken (JP); Junya Yano, Aichi-ken (JP); Yusuke Kinoshita, Aichi-ken (JP); Shumpei Yamakage, Aichi-ken (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 0 days.

(21) Appl. No.: 17/157,488

(22) Filed: Jan. 25, 2021

(65) Prior Publication Data
US 2021/0239106 A1  Aug. 5, 2021

(30) Foreign Application Priority Data
Jan. 30, 2020  (JP) .............................. JP2020-013529

(51) Int. Cl.
| | | |
|---|---|---|
| *F04B 39/12* | (2006.01) | |
| *F04C 18/02* | (2006.01) | |
| *H02K 5/22* | (2006.01) | |
| *H02K 11/33* | (2016.01) | |
| *F25B 49/02* | (2006.01) | |

(52) U.S. Cl.
CPC ........ *F04B 39/121* (2013.01); *F04C 18/0215* (2013.01); *F25B 49/022* (2013.01); *H02K 5/225* (2013.01); *H02K 11/33* (2016.01); *F04C 2240/30* (2013.01); *F04C 2240/808* (2013.01)

(58) Field of Classification Search
CPC ............ F04C 2240/30; F04C 2240/808; F04C 18/0215; H02K 11/33; H02K 5/225; F04B 39/121; F25B 49/022
See application file for complete search history.

(56) References Cited

U.S. PATENT DOCUMENTS

| | | | | |
|---|---|---|---|---|
| 6,198,183 | B1* | 3/2001 | Baeumel | H02K 5/20 |
| | | | | 310/52 |
| 7,207,187 | B2* | 4/2007 | Funahashi | F04C 29/0085 |
| | | | | 62/505 |
| 7,473,079 | B2* | 1/2009 | Ogawa | F01C 21/10 |
| | | | | 417/410.5 |
| 9,599,109 | B2* | 3/2017 | Yakushiji | F04B 39/06 |
| 10,024,312 | B2* | 7/2018 | Okada | F04B 35/04 |
| 11,008,867 | B2* | 5/2021 | Jang | F01C 17/066 |
| 11,177,715 | B2* | 11/2021 | Ogawa | H02K 5/10 |

(Continued)

FOREIGN PATENT DOCUMENTS

| | | |
|---|---|---|
| JP | 2008-019767 | 1/2008 |
| KR | 2018-0075353 | 7/2018 |

*Primary Examiner* — Christopher S Bobish
(74) *Attorney, Agent, or Firm* — Greenblum & Bernstein, P.L.C.

(57) ABSTRACT

An electric compressor includes a housing, an inverter, an inverter case, a case bottom wall, and a case peripheral wall. The inverter case has a seal peripheral wall. The seal peripheral wall has a cylindrical shape and extends from the case bottom wall in a direction opposite to a direction in which the case peripheral wall extends. The seal peripheral wall surrounds a part of an outer peripheral surface of the housing. A seal member having an annular shape seals a gap between an inner peripheral surface of the seal peripheral wall and the outer peripheral surface of the housing.

3 Claims, 4 Drawing Sheets

(56) References Cited

U.S. PATENT DOCUMENTS

| | | | |
|---|---|---|---|
| 2002/0117914 A1* | 8/2002 | Doi | H02K 29/08 |
| | | | 310/68 B |
| 2008/0181791 A1* | 7/2008 | Iguchi | F04C 23/008 |
| | | | 417/366 |
| 2010/0074772 A1* | 3/2010 | Hoshino | F04B 35/04 |
| | | | 417/410.1 |
| 2012/0063935 A1* | 3/2012 | Fujimura | F04C 23/008 |
| | | | 417/410.1 |
| 2013/0320792 A1* | 12/2013 | Fukasaku | H02K 5/12 |
| | | | 310/89 |
| 2016/0065027 A1* | 3/2016 | Taniguchi | H02K 7/083 |
| | | | 310/91 |
| 2017/0276136 A1* | 9/2017 | Kinoshita | F04C 29/0085 |
| 2020/0224659 A1* | 7/2020 | Yoo | F01C 21/02 |
| 2021/0156380 A1* | 5/2021 | Kataoka | H02K 11/33 |

\* cited by examiner

ELECTRIC COMPRESSOR

CROSS-REFERENCE TO RELATED APPLICATION

This application claims priority to Japanese Patent Application No. 2020-013529 filed on Jan. 30, 2020, the entire disclosure of which is incorporated herein by reference.

The present disclosure relates to an electric compressor.

BACKGROUND ART

An electric compressor includes a compression part configured to compress fluid, an electric motor configured to drive the compression part, an inverter including a circuit board for driving the electric motor, and a housing having a bottomed-cylindrical shape and accommodating the electric motor. The electric compressor further includes an inverter case and an inverter cover. The inverter case has a bottomed-cylindrical shape, and has a case bottom wall having a plate-like shape and a case peripheral wall having a cylindrical shape. The case peripheral wall extends from an outer peripheral portion of the case bottom wall. The case bottom wall faces a bottom wall of the housing. The inverter cover closes an opening of the case peripheral wall and cooperates with the inverter case to form an inverter accommodation chamber for accommodating the inverter. A gap between the inverter cover and an end face of the case peripheral wall, which is distant from the case bottom wall, is sealed by an annular gasket that is pressed by bolt fastening.

The circuit board has thereon an electronic component. If the electronic component is increased in size, the component may not be accommodated in the inverter accommodation chamber. However, if the inverter case and the inverter cover are increased in size so that the increased electronic component can be accommodated in the inverter accommodation chamber, the electric compressor has to be increased in size accordingly. To solve this problem, for example in Korean Unexamined Publication No. 10-2018-0075353, a part of an electronic component is inserted through a through hole that is formed through a case bottom wall. This configuration allows the electronic component to be accommodated in an inverter accommodation chamber, without increasing an inverter case and an inverter cover in size, even if the electronic component is increased in size. However, this configuration requires that a gap between the inverter case and the housing is sealed by a seal member.

Further, for example, the electronic component is inserted through the through hole and brought thermally into contact with an outer surface of the bottom wall of the housing via gel or the like, so that heat, which is generated from the electronic component, is dissipated efficiently to the housing without passing through the inverter case. This allows an increase in the durability of the electronic component.

However, if the through hole is formed through the case bottom wall as shown in the Publication, the stiffness of the inverter case is reduced and the inverter case is likely to become deformed by fastening power of a bolt which is used for attaching the inverter cover to the inverter case via a gasket. The deformation of the inverter case is likely to generate a gap between the inverter cover and an end face of the case peripheral wall distant from the case bottom wall.

Further, the case bottom wall becomes unevenly deformed. Therefore, for example, when the seal member is disposed between the outer surface of the case bottom wall and the outer surface of the bottom wall of the housing to seal a gap between the inverter case and the housing, the gap between the outer surface of the case bottom wall and the outer surface of the bottom wall of the housing becomes uneven, which causes a decrease in sealing of the inverter accommodation chamber. Further, this configuration prevents the suitable thermal contact between the outer surface of the case bottom wall and the outer surface of the bottom wall of the housing. As a result, this configuration may prevent the efficient dissipation of heat which is generated from the electronic component disposed in the inverter accommodation chamber, to the housing.

The present disclosure, which has been made in light of the above-mentioned problem, is directed to providing an electric compressor that maintains sealing of the inverter accommodation chamber and efficiently dissipates heat which is generated from an electronic component, to a housing without an increase of the electric compressor in size.

SUMMARY

In accordance with an aspect of the present invention, there is provided an electric compressor that includes a compression part, an electric motor, an inverter, a housing, an inverter case, an inverter cover, and a fastening bolt. The compression part is configured to compress fluid. The electric motor is configured to drive the compression part. The inverter includes a circuit board that is configured to drive the electric motor. The housing has a bottomed-cylindrical shape and accommodates the electric motor. The inverter case has a bottomed-cylindrical shape. The inverter case has a case bottom wall and a case peripheral wall. The case bottom wall has a plate-like shape and faces a bottom wall of the housing. The case peripheral wall has a cylindrical shape and extends from an outer peripheral portion of the case bottom wall. The inverter cover closes an opening of the case peripheral wall and cooperates with the inverter case to form an inverter accommodation chamber for accommodating the inverter. The fastening bolt fastens the inverter case to the housing. The case bottom wall has a through hole through which an electronic component is inserted. The electronic component is mounted on the circuit board and thermally in contact with an outer surface of the bottom wall of the housing. A seal member has an annular shape and seals a gap between the inverter case and the housing. The inverter case has a seal peripheral wall that has a cylindrical shape and extends from the case bottom wall in a direction opposite to a direction in which the case peripheral wall extends. The seal peripheral wall surrounds a part of an outer peripheral surface of the housing. The seal member seals a gap between an inner peripheral surface of the seal peripheral wall and the outer peripheral surface of the housing.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure together with objects and advantages thereof, may best be understood by reference to the following description of the embodiment together with the accompanying drawings in which.

DETAILED DESCRIPTION OF THE EMBODIMENTS

The following will describe an embodiment of an electric compressor with reference to accompanying FIGS. 1 to 4. The electric compressor of the embodiment is used, for example, for a vehicle air conditioner.

Figure 1:
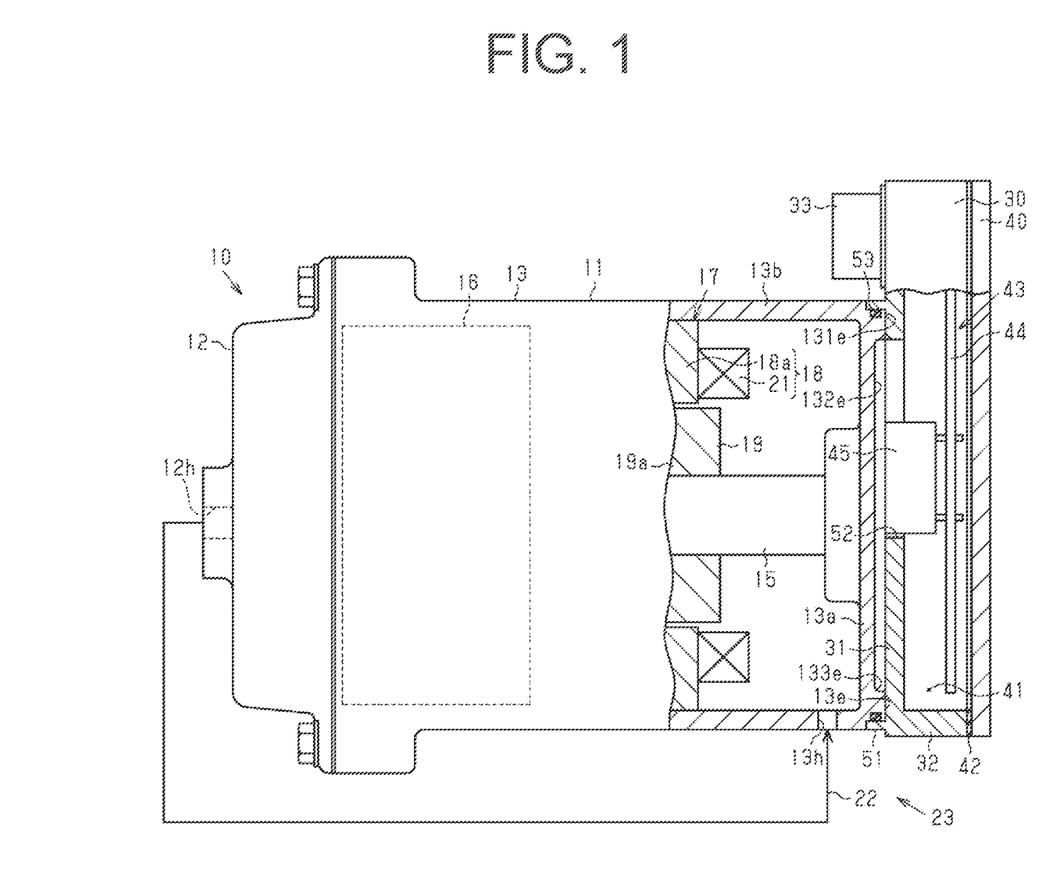
FIG. 1 is a sectional side view of an electric compressor according to an embodiment of the present disclosure.

As illustrated in FIG. 1, an electric compressor 10 includes a housing 11 having a bottomed-cylindrical shape and made of metal. The housing 11 includes a discharge housing 12 having a bottomed-cylindrical shape and a motor housing 13 having a bottomed-cylindrical shape and connected to the discharge housing 12. The discharge housing 12 and the motor housing 13 are made of a metallic material, such as aluminum. The motor housing 13 has a bottom wall 13a having a plate-like shape and a peripheral wall 13b having a cylindrical shape and extending from an outer peripheral portion of the bottom wall 13a. The peripheral wall 13b of the motor housing 13 has an inlet 13h for suction of refrigerant, which serves as fluid, into the motor housing 13.

The motor housing 13 accommodates a rotary shaft 15. The rotary shaft 15 accommodated in the motor housing 13 is coaxial with the peripheral wall 13b of the motor housing 13. The motor housing 13 further accommodates a compression part 16 that is driven by rotation of the rotary shaft 15 to compress the refrigerant and an electric motor 17 that is configured to rotate the rotary shaft 15 to drive the compression part 16. Accordingly, the housing 11 accommodates the compression part 16 and the electric motor 17. The compression part 16 and the electric motor 17 are arranged alongside in an axial direction of the rotary shaft 15. The electric motor 17 is located between the compression part 16 and the bottom wall 13a of the motor housing 13.

The compression part 16 is, for example, a scroll compressor that includes a fixed scroll fixed inside the motor housing 13 and a movable scroll disposed facing the fixed scroll, which are not illustrated.

The electric motor 17 includes a stator 18 having a cylindrical shape and a rotor 19 disposed inside the stator 18. The rotor 19 rotates together with the rotary shaft 15. The stator 18 surrounds the rotor 19. The rotor 19 includes a rotor core 19a fixed to the rotary shaft 15 and a plurality of permanent magnets, which is not illustrated, disposed in the rotor core 19a. The stator 18 includes a stator core 18a having a cylindrical shape and a motor coil 21 wound around the stator core 18a.

The inlet 13h is connected to one end of an external refrigerant circuit 22. The discharge housing 12 has an outlet 12h. The outlet 12h is connected to the other end of the external refrigerant circuit 22. The refrigerant is drawn from the external refrigerant circuit 22 into the motor housing 13 through the inlet 13h, compressed by the compression part 16, and discharged into the external refrigerant circuit 22 through the outlet 12h. The refrigerant discharged into the external refrigerant circuit 22 returns to the motor housing 13 through a heat exchanger and an expansion valve (not illustrated) of the external refrigerant circuit 22, and the inlet 13h. The electric compressor 10 and the external refrigerant circuit 22 are included in a vehicle air conditioner 23.

Figure 2:
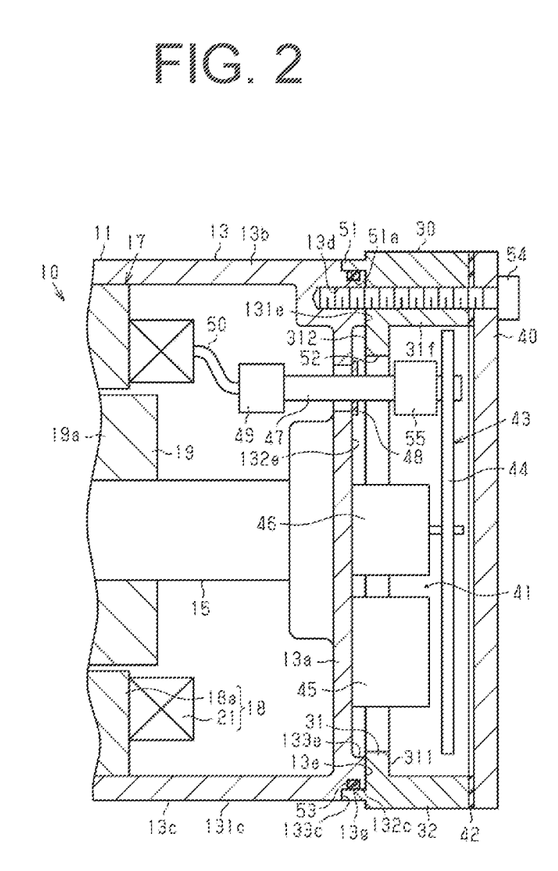
FIG. 2 is a sectional view of a part of the electric compressor.

As illustrated in FIGS. 1 and 2, the electric compressor 10 includes an inverter case 30 having a bottomed-cylindrical shape. The inverter case 30 has a case bottom wall 31 that has a plate-like shape and a case peripheral wall 32 that has a cylindrical shape and extends from an outer peripheral portion of the case bottom wall 31. The case bottom wall 31 faces the bottom wall 13a of the motor housing 13. The case bottom wall 31 is attached to the bottom wall 13a of the motor housing 13, so that the inverter case 30 is connected to the motor housing 13. The case bottom wall 31 has an area that is greater than that of the bottom wall 13a of the motor housing 13, so that a part of the case bottom wall 31 protrudes outwardly from an edge of the bottom wall 13a of the motor housing 13. Accordingly, a part of the case peripheral wall 32 also protrudes outwardly from the edge of the bottom wall 13a of the motor housing 13. An external power supply connector connection part 33 and a control connector connection part 34 protrude from the part of the case bottom wall 31 that protrudes from the edge of the bottom wall 13a of the motor housing 13. The external power supply connector connection part 33 and the control connector connection part 34 each have a cylindrical shape.

The electric compressor 10 further includes an inverter cover 40 that has a plate-like shape and closes an opening of the case peripheral wall 32. The inverter cover 40 cooperates with the inverter case 30 to form an inverter accommodation chamber 41. The electric compressor 10 further includes a gasket 42 that has a loop shape and is disposed between the inverter cover 40 and an end face of the case peripheral wall 32 that is distant from the case bottom wall 31. The gasket 42 seals a gap between the inverter cover 40 and the end face of the case peripheral wall 32 distant from the case bottom wall 31.

The electric compressor 10 includes an inverter 43. The inverter 43 includes a circuit board 44 that is configured to drive the electric motor 17. The inverter 43 is accommodated in the inverter accommodation chamber 41. Accordingly, the inverter accommodation chamber 41 accommodates the inverter 43. The compression part 16, the electric motor 17, and the inverter 43 are arranged alongside in this order in the axial direction of the rotary shaft 15.

As illustrated in FIG. 2, the circuit board 44 has thereon a capacitor 45 and a coil 46. The capacitor 45 and the coil 46 are electronic components of an LC filter. The circuit board 44 further has thereon a power module (not illustrated). The power module is an electronic component with modularized multiple switching elements (not illustrated). The capacitor 45, the coil 46, and the power module are electronic components mounted on the circuit board 44.

Figure 3:
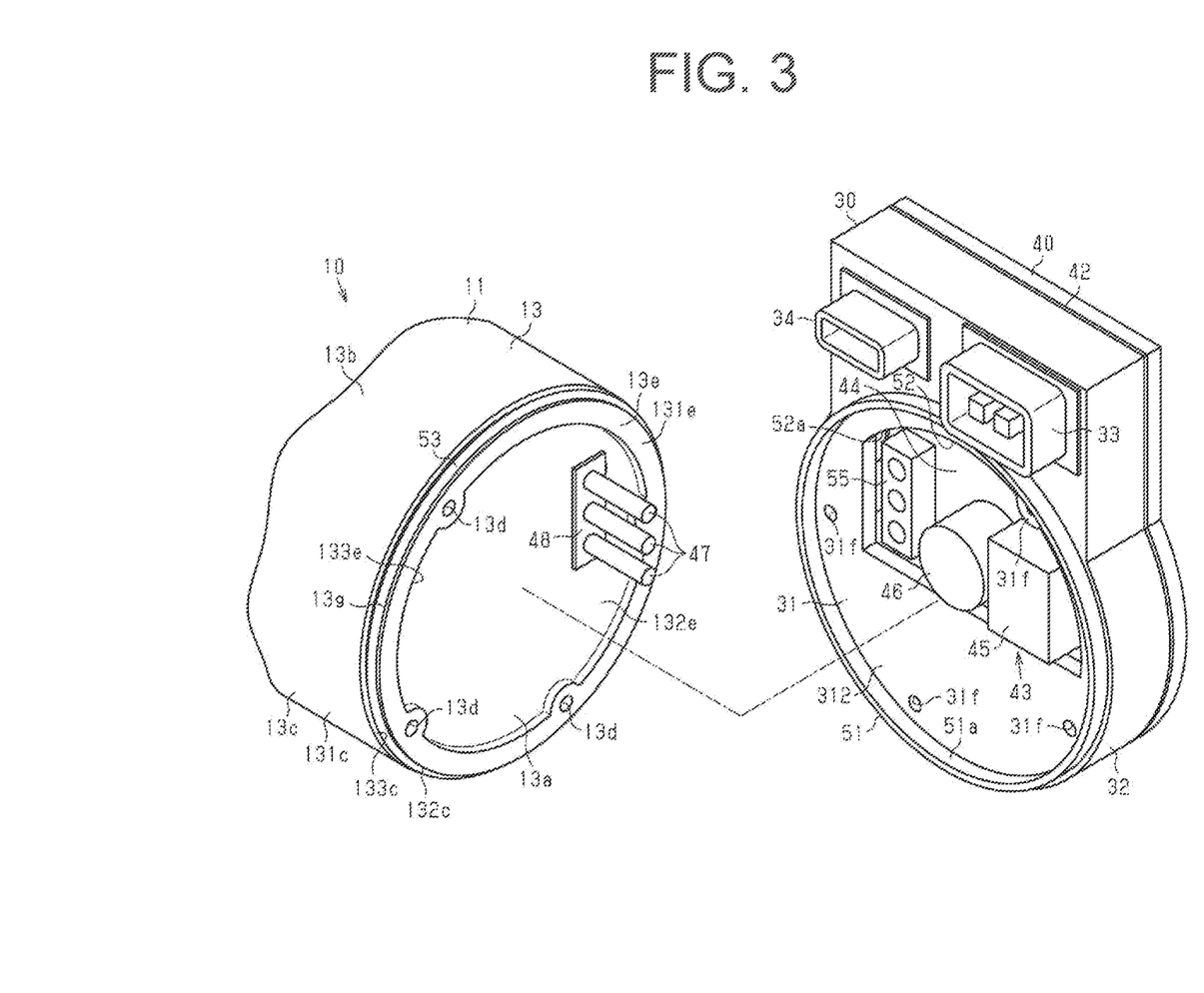
FIG. 3 is an exploded perspective view of the part of the electric compressor.

As illustrated in FIGS. 2 and 3, the motor housing 13 has an outer peripheral surface 13c that has a first surface 131c and a second surface 132c. The second surface 132c has a smaller outer diameter than the first surface 131c. The second surface 132c is located at one end of the outer peripheral surface 13c of the motor housing 13 adjacent to the bottom wall 13a. The second surface 132c is continuous with an outer surface 13e of the bottom wall 13a of the motor housing 13. The first surface 131c is continuous with the second surface 132c via a stepped surface 133c that has an annular shape and extends in a radial direction of the motor housing 13.

The outer surface 13e of the bottom wall 13a of the motor housing 13 has an outermost surface 131e and a recessed surface 132e that is recessed with respect to the outermost surface 131e. The outermost surface 131e is located at an outer peripheral portion of the outer surface 13e and has an annular shape that extends circularly around the whole circumference of the outer surface 13e. The outermost surface 131e is continuous with the second surface 132c of the motor housing 13. The outermost surface 131e is continuous with the recessed surface 132e via a stepped surface 133e that has an annular shape and extends in an axial direction of the motor housing 13.

The motor housing 13 has a plurality of female threaded holes 13d. Each female threaded hole 13d extends n the axial direction of the motor housing 13 and is opened on the outermost surface 131e of the bottom wall 13a of the motor housing 13. The female threaded holes 13d are spaced apart in a circumferential direction of the motor housing 13. The outermost surface 131e is raised in the vicinity of each female threaded hole 13d so as to have an arc shape in the axial direction of the motor housing 13.

The bottom wall 13a of the motor housing 13 has three conductive members 47 for power supply to the electric motor 17. The three conductive members 47 are supported by the bottom wall 13a of the motor housing 13 via a support plate 48. The three conductive members 47 pass through the bottom wall 13a of the motor housing 13 into the motor housing 13. The three conductive members 47 are electrically and respectively connected, via a duster block 49 disposed in the motor housing 13, to three motor wires 50 that are pulled out from the electric motor 17. The support plate 48 is attached to the recessed surface 132e, and the three conductive members 47 protrude through the recessed surface 132e.

Figure 4:
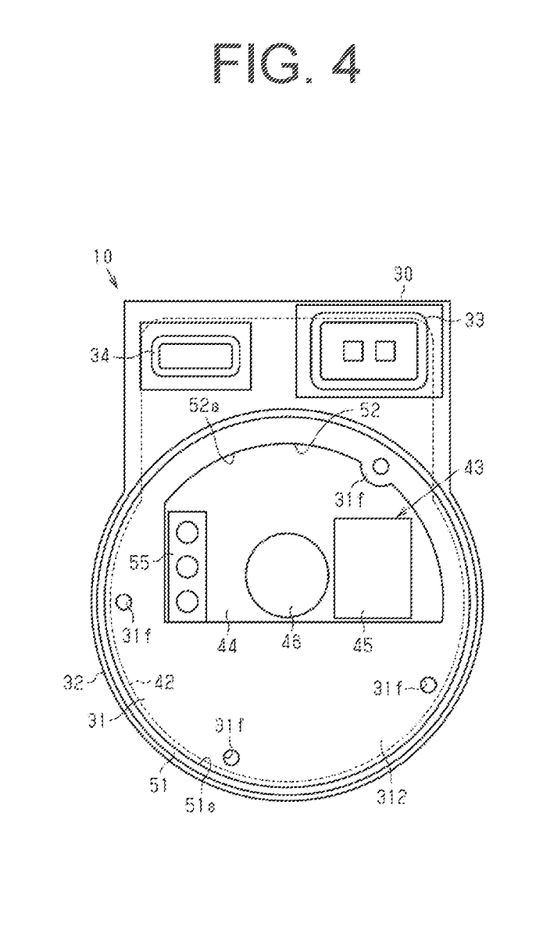
FIG. 4 is a plan view of an inverter case.

As illustrated in FIGS. 3 and 4, the inverter case 30 has a seal peripheral wall 51 that has a cylindrical shape and extends from the case bottom wall 31 in a direction opposite to a direction in which the case peripheral wall 32 extends. The seal peripheral wall 51 has an inner diameter that is larger than the outer diameter of the second surface 132c of the motor housing 13 and smaller than an outer diameter of the first surface 131c of the motor housing 13. The seal peripheral wall 51 has an inner peripheral surface 51a that extends along and surrounds the second surface 132c of the motor housing 13. Accordingly, the outer peripheral surface 13c of the motor housing 13 is surrounded by the seal peripheral wall 51. At least a part of the seal peripheral wall 51 overlaps the case peripheral wall 32 when the seal peripheral wall 51 is viewed from an axial direction of the case peripheral wall 32.

As illustrated in FIGS. 2 and 3, the case bottom wall 31 has a surface 311 adjacent to the case peripheral wall 32 and on which a plurality of bosses 31f protrude. Each of the bosses 31f has a cylindrical shape. The case bottom wall 31 further has a surface 312 adjacent to the seal peripheral wall 51 and on which each boss 31f is opened. The boss 31f is opened on the surface 312 of the case bottom wall 31 adjacent to the seal peripheral wall 51 at a position inward of the seal peripheral wall 51 as viewed from an axial direction of the seal peripheral wall 51. The bosses 31f are in communication with the female threaded holes 13d, respectively.

As illustrated in FIGS. 3 and 4, the case bottom wall 31 of the inverter case 30 has a through hole 52 through which the capacitor 45 and the coil 46 are inserted. The capacitor 45 and the coil 46 are inserted through the through hole 52 and are thermally in contact with the recessed surface 132e of the motor housing 13 via gel (not illustrated). The through hole 52 is formed in a region of the case bottom wall 31 that is located inside the seal peripheral wall 51. The through hole 52 has an inner peripheral surface 52a that is away from the inner peripheral surface 51a of the seal peripheral wall 51. A part of the case bottom wall 31 is located between the through hole 52 and the seal peripheral wall 51. The surface 312 of the case bottom wall 31 adjacent to the seal peripheral wall 51 is continuous with the inner peripheral surface 51a of the seal peripheral wall 51 on the whole circumference of the inner peripheral surface 51a when viewed from the axial direction of the seal peripheral wall 51. Accordingly, the surface 312 of the case bottom wall 31 adjacent to the seal peripheral wall 51 is continuous with the inner peripheral surface 51a of the seal peripheral wall 51 at least in the part of the seal peripheral wall 51 overlapping the case peripheral wall 32 when the seal peripheral wall 51 is viewed from the axial direction of the seal peripheral wall 51. That is, the surface 312 of the case bottom wall 31 adjacent to the seal peripheral wall 51 is continuous with the inner peripheral surface 51a of the seal peripheral wall 51 also in the rest of the seal peripheral wall 51 not overlapping the case peripheral wall 32 when the seal peripheral wall 51 is viewed from the axial direction of the seal peripheral wall 51.

As illustrated in FIG. 2, the second surface 132c of the motor housing 13 has a ring attachment groove 13g having an annular shape. A seal member 53 is disposed in the ring attachment groove 13g. The seal member 53 has an annular shape to seal a gap between the inner peripheral surface 51a of the seal peripheral wall 51 and the second surface 132c of the motor housing 13. The electric compressor 10 includes a plurality of fastening bolts 54 for fastening the inverter case 30 to the motor housing 13. Specifically, the fastening bolts 54 pass through the inverter cover 40 and the gasket 42 and are respectively screwed into the female threaded holes 13d through the boss 31f, so that the inverter cover 40 and the inverter case 30 are attached to the bottom wall 13a of the motor housing 13 with the fastening bolts 54. The surface 312 of the case bottom wall 31 adjacent to the seal peripheral wall 51 is in contact with the outermost surface 131e of the bottom wall 13a of the motor housing 13 while the seal peripheral wall 51 surrounds the second surface 132c of the motor housing 13 in a state where the inverter case 30 is attached to the bottom wall 13a of the motor housing 13. The seal member 53 seals the gap between the inner peripheral surface 51a of the seal peripheral wall 51 and the second surface 132c of the motor housing 13. Accordingly, the seal member 53 seals a gap between the inverter case 30 and the motor housing 13.

The three conductive members 47 protrude into the inverter accommodation chamber 41 through the through hole 52, and are electrically connected to the circuit board 44 via a connector 55 that is accommodated in the inverter accommodation chamber 41.

Next, the following will explain the operation of the electric compressor according to the embodiment.

The electric power is controlled by the circuit board 44 and supplied to the electric motor 17 through the connector 55; the conductive members 47, the duster block 4S, and the motor wires 50. This activates the electric motor 17, and the electric motor 17 rotates the rotary shaft 15 to drive the compression part 16 for compressing the refrigerant. Since the capacitor 45 and the coil 46 are thermally in contact with the outer surface 13e of the bottom wall 13a of the motor housing 13 through the through hole 52, heat generated from the capacitor 45 and the coil 46 is efficiently dissipated to the motor housing 13.

The aforementioned embodiment provides the following advantageous effects.

(1) The annular shaped seal member 53 seals the gap between the inner peripheral surface 51a of the seal peripheral wall 51 and the outer peripheral surface 13c of the motor housing 13. Accordingly, the capacitor 45 and the coil 46 pass through the case bottom wall 31 for increasing the heat dissipation. This configuration enables sealing of the inverter accommodation chamber 41 to be maintained even if the gap between an outer surface of the case bottom wall 31 and the outer surface 13e of the bottom wall 13a of the motor housing 13 becomes uneven due to the uneven deformation of the case bottom wall 31 caused by the fastening power of the fastening bolts 54. This configuration thus enables efficient dissipation of the heat generated from the capacitor 45 and the coil 46 to the motor housing 13. Therefore, the electric compressor 10 according to the embodiment maintains sealing of the inverter accommodation chamber 41 and efficiently dissipates the heat generated from the capacitor 45 and the coil 46 to the motor housing 13 without an increase of the electric compressor 10 in size.

(2) The surface 312 of the case bottom wall 31 adjacent to the seal peripheral wall 51 is in contact with the outer surface 13e of the bottom wall 13a of the motor housing 13. This configuration allows the motor housing 13 to reduce the deformation of the inverter case 30 even if the inverter case 30 receives the reaction force of the gasket 42 or the fastening power of the fastening bolts 54 after the inverter cover 40 is attached to the inverter case 30 via the gasket 42. As a result, this configuration eliminates or minimizes creation of the gap between the inverter cover 40 and the end face of the case peripheral wall 32 distant from the case bottom wall 31, thereby enabling the gasket 42 to maintain its sealing of the gap between the inverter cover 40 and the end face of the case peripheral wall 32 distant from the case bottom wall 31.

(3) The surface 312 of the case bottom wall 31 adjacent to the seal peripheral wall 51 is continuous with the inner peripheral surface 51a of the seal peripheral wall 51 on the whole circumference of the inner peripheral surface 51a when viewed from the axial direction of the seal peripheral wall 51. This configuration increases the stiffness of the inverter case 30, compared with a case where the surface 312 of the case bottom wall 31 adjacent to the seal peripheral wall 51 is not continuous with the inner peripheral surface 51a of the seal peripheral wall 51 in a part of the seal peripheral wall 51 not overlapping the case peripheral wall 32 when the seal peripheral wall 51 is viewed from the axial direction of the seal peripheral wall 51. Increasing the stiffness of the inverter case 30 allows the surface 312 of the case bottom wall 31 adjacent to the seal peripheral wall 51 to be thermally in contact with the outer surface 13e of the bottom wall 13a of the motor housing 13 suitably, thereby enabling efficient dissipation of the heat from the inverter accommodation chamber 41 to the motor housing 13.

The aforementioned embodiment may be modified as below. The embodiment may be combined with the following modifications within technically consistent range.

Figure 5:
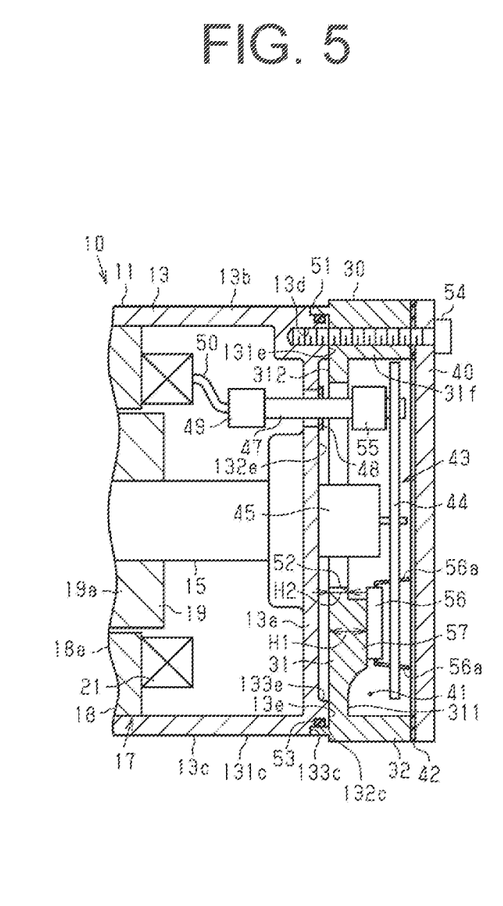
FIG. 5 is a sectional view of a part of an electric compressor according to another embodiment.

According to the embodiment, the power module 56 is mounted on the circuit board 44, but as illustrated in FIG. 5, the power module 56 may be mounted on a mounting surface area 57 that is a part of the surface 311 of the case bottom wall 31, wherein the surface 311 is adjacent to the case peripheral wall 32. Accordingly, the circuit board 44 further has thereon the power module 56 (another electronic component) in addition to the electronic components inserted through the through hole 52, wherein the power module 56 is mounted on the mounting surface area 57 that is a part of the surface 311 of the case bottom wall 31 adjacent to the case peripheral wall 32. The power module 56 is, for example, a compact electronic component that can be accommodated in the inverter accommodation chamber 41 without being inserted through the through hole 52 unlike the capacitor 45 and the coil 46.

The power module 56 is mounted on the circuit board 44 by electrical connection of lead wires 56a, which protrude from the power module 56, to the circuit board 44. The surface 311 of the case bottom wall 31 is adjacent to the case peripheral wall 32, and the mounting surface area 57 of the surface 311 is closer to the inverter cover 40 than the area of the surface 311 other than the mounting surface area 57 is. Specifically, the case bottom waif 31 has a thickness H1 at the mounting surface area 57 of the surface 311 and a thickness H2 at the area of the surface 311 other than the mounting surface area 57, and the thickness H1 is greater than the thickness H2.

This configuration allows the power module 56, which can be accommodated in the inverter accommodation chamber 41 without being inserted through the through hole 52, to be mounted on the circuit board 44 with the power module 56 mounted on the mounting surface area 57. This eliminates the need for extending the lead wires 56a that protrude from the power module 56. This configuration thus a lows the lead wires 56a of the power module 56 to be shortened as much as possible and improves vibration tolerance of the lead wires 56a.

In the embodiment, the whole of the seal peripheral wall 51 may overlap the case peripheral wall 32 when the seal peripheral wall 51 is viewed from the axial direction of the case peripheral wall 32. That is, at least a part of the seal peripheral wall 51 has to overlap the case peripheral wall 32 when the seal peripheral wall 51 is viewed from the axial direction of the case peripheral wall 32.

In the embodiment, the surface 312 of the case bottom wall 31 adjacent to the seal peripheral wall 51 does not have to be continuous with the inner peripheral surface 51a of the seal peripheral wall 51 in the rest of the seal peripheral wall 51 not overlapping the case peripheral wall 32 when viewed from the axial direction of the seal peripheral wall 51. That is, the surface 312 of the case bottom wall 31 adjacent to the seal peripheral wall 51 has to be continuous with the inner peripheral surface 51a of the seal peripheral wall 51 at least in the part of the seal peripheral wall 51 overlapping the case peripheral wall 32 when the seal peripheral wall 51 is viewed from the axial direction of the seal peripheral wall 51.

In the embodiment, the member disposed between the capacitor 45, the coil 46, and the motor housing 13 does not have to be gel. For example, the member may be a sheet made of a material with high heat dissipation. Alternatively, the capacitor 45 and the coil 46 may be in contact directly with the motor housing 13 without any member disposed between the capacitor 45, the coil 46, and the motor housing 13.

In the embodiment the compression part 16 is not limited to a scroll compressor, but may be a piston compressor or a vane compressor, for example.

In the embodiment the electric compressor 10 is included in the vehicle air conditioner 23; but the electric compressor 10 may be mounted to a fuel cell vehicle and configured to compress air as fluid, which is supplied to a fuel cell, with the compression part 16.

What is claimed is:

1. An electric compressor comprising:
a compression part configured to compress fluid;
an electric motor configured to drive the compression part;

an inverter including a circuit board that is configured to drive the electric motor;
a housing having a bottomed-cylindrical shape and accommodating the electric motor;
an inverter case having a bottomed-cylindrical shape, wherein the inverter case has:
　a case bottom wall having a plate-like shape and facing a bottom wall of the housing; and
　a case peripheral wall having a cylindrical shape and extending from an outer peripheral portion of the case bottom wall;
an inverter cover closing an opening of the case peripheral wall and cooperating with the inverter case to form an inverter accommodation chamber for accommodating the inverter; and
a fastening bolt for fastening the inverter case to the housing,
wherein the compression part, the electric motor, and the inverter are arranged in this order in an axial direction of a rotary shaft,
wherein the case bottom wall has a through hole, and an electronic component is mounted on the circuit board is inserted through the through hole and thermally in contact with an outer surface of the bottom wall of the housing,
wherein a seal member having an annular shape seals a gap between the inverter case and the housing,
wherein
the inverter case has a seal peripheral wall that has a cylindrical shape and extends from the case bottom wall in a direction opposite to a direction in which the case peripheral wall extends,
the seal peripheral wall surrounds a part of an outer peripheral surface of the housing, and
the seal member seals a gap between an inner peripheral surface of the seal peripheral wall and the outer peripheral surface of the housing.

2. The electric compressor according to claim 1, wherein
the electric compressor includes a gasket that has a loop shape and seals a gap between an end face of the case peripheral wall and the inverter cover,
the case bottom wall has a surface adjacent to the seal peripheral wall, and
the surface of the case bottom wall is in contact with the outer surface of the bottom wall of the housing.

3. The electric compressor according to claim 1, wherein
the circuit board has another electronic component mounted on the circuit board, wherein the another electronic component is mounted on a mounting surface area that is a part of a surface of the case bottom wall adjacent to the case peripheral wall, and
the mounting surface area of the surface is closer to the inverter cover than an area of the surface other than the mounting surface area is.

* * * * *

UNITED STATES PATENT AND TRADEMARK OFFICE
CERTIFICATE OF CORRECTION

PATENT NO. : 11,486,378 B2
APPLICATION NO. : 17/157488
DATED : November 1, 2022
INVENTOR(S) : Okochi et al.

It is certified that error appears in the above-identified patent and that said Letters Patent is hereby corrected as shown below:

In the Claims

Column 9, Line 22 (Claim 1, Line 26), please change "is mounted" to -- mounted --.

Signed and Sealed this
Twenty-eighth Day of March, 2023

Katherine Kelly Vidal
*Director of the United States Patent and Trademark Office*